US012521497B2

(12) United States Patent
Zolotukhin (10) Patent No.: US 12,521,497 B2
(45) Date of Patent: Jan. 13, 2026

(54) BALL LOCK ASSEMBLY WITH RETENTION PIN (71) Applicant: PULSE NEEDLEFREE SYSTEMS, INC., Lenexa, KS (US)

(72) Inventor: Mikhail Zolotukhin, Shawnee, KS (US)

(73) Assignee: PULSE NEEDLEFREE SYSTEMS, INC., Lenexa, KS (US)

( * ) Notice: Subject to any disclaimer, the term of this patent is extended or adjusted under 35 U.S.C. 154(b) by 941 days.

(21) Appl. No.: 17/289,840

(22) PCT Filed: Nov. 11, 2019

(86) PCT No.: PCT/US2019/060702
§ 371 (c)(1),
(2) Date: Apr. 29, 2021

(87) PCT Pub. No.: WO2020/102066
PCT Pub. Date: May 22, 2020

(65) Prior Publication Data
US 2021/0402105 A1    Dec. 30, 2021

Related U.S. Application Data (60) Provisional application No. 62/760,601, filed on Nov. 13, 2018.

(51) Int. Cl.
*A61M 5/48*   (2006.01)
*A61M 5/315*  (2006.01)
(52) U.S. Cl.
CPC .......... *A61M 5/48* (2013.01); *A61M 5/31501* (2013.01)

(58) Field of Classification Search
CPC ...... A61M 5/2033; A61M 5/24; A61M 5/326; A61M 5/3204; A61M 5/2053; A61M 5/48;
(Continued)

(56) References Cited

U.S. PATENT DOCUMENTS 6,379,072 B1 * 4/2002 Brown ............... F16B 21/165
                                                 403/322.2
6,416,305 B1   7/2002 Singh
(Continued)

FOREIGN PATENT DOCUMENTS

WO    WO 2001/37907 A1   5/2001

OTHER PUBLICATIONS

European Search Report dated Jul. 15, 2022 for related European Patent Application 19884760.0 (7 pgs).
(Continued)

*Primary Examiner* — Michael J Tsai
*Assistant Examiner* — Justin L Zamory
(74) *Attorney, Agent, or Firm* — STINSON LLP (57) ABSTRACT In an aspect, the present invention is directed to a ball lock assembly comprising a retention pin for use with an injection device. The ball lock assembly includes a ball lock frame and a ball lock core housed within the ball lock frame that includes a longitudinal opening within which a portion of the pin is positioned. In other aspect, the present invention is directed to an injection device that includes the ball lock assembly of the present invention and a method of using the same.

19 Claims, 6 Drawing Sheets (58) Field of Classification Search
CPC ...... A61M 5/31501; A61M 2005/2418; A61M 2005/3143; A61M 2005/2086; A61M 2005/202; A61M 2005/206; Y10T 403/592
See application file for complete search history.

(56) References Cited

U.S. PATENT DOCUMENTS

| | | | | |
|---|---|---|---|---|
| 6,770,054 | B1* | 8/2004 | Smolyarov | A61M 5/178 |
| | | | | 604/131 |
| 7,029,457 | B2 | 4/2006 | Rogatchev et al. | |
| 2001/0005781 | A1* | 6/2001 | Bergens | A61M 5/2033 |
| | | | | 604/156 |
| 2002/0149200 | A1* | 10/2002 | Fumioka | F16L 37/23 |
| | | | | 285/81 |
| 2003/0088207 | A1* | 5/2003 | Rogatchev | A61M 5/30 |
| | | | | 2/102 |
| 2006/0129089 | A1 | 6/2006 | Stamp | |
| 2006/0270972 | A1 | 11/2006 | Lindmayer | |
| 2009/0082753 | A1 | 3/2009 | Dutcher et al. | |
| 2012/0080333 | A1 | 4/2012 | Woodard, Jr. et al. | |
| 2018/0304018 | A1 | 10/2018 | Blondino et al. | |

OTHER PUBLICATIONS

Product Flyer, "Pulse 50 Micro Dose Injection System™", Pulse Needlefree Systems, 2008 (1 pg).
Parts Manual, Microdose P50, P50-Internal Parts, Pulse Needlefree Systems, Nov. 1, 2016 (2 pgs).
Photographs of Pulse 50 MicroDose Injection System, Pulse Needlefree Systems, 2008 (3 pgs).
International Search Report and Written Opinion dated Jan. 30, 2020 for related PCT application, PCT/US2019/060702 (11 pgs).

* cited by examiner

BALL LOCK ASSEMBLY WITH RETENTION PIN

CROSS-REFERENCE TO RELATED APPLICATIONS

This application is based on and claims priority to U.S. Provisional Application Ser. No. 62/760,601 filed on Nov. 13, 2018, which is hereby incorporated herein by reference.

BACKGROUND OF THE INVENTION

1. Field of the Invention

The present invention relates to the field of injection devices.

2. Description of Related Art

Ball locks are primarily used to removably secure two members to one another. For example, ball locks are sometimes utilized to retain and release pistons, piston rods and/or other propulsion mechanisms in high-pressure hydraulic systems and other propulsion systems, including hand-held injection devices. In such devices, ball locks function to join together two members—one of which is movable—until a particular pneumatic pressure is achieved, at which point in time the ball locks are released, which in turn causes the propulsion of the movable member (e.g., pneumatic piston, hydraulic piston, plunger, etc.). This function is important because the two members must remain joined together as pneumatic pressure builds in order to prevent premature release of the movable member and to rapidly provide a high level of energy upon the unlocking of the ball locks. Moreover, because such devices require automated actuation cycles, it is desirable for the two members to remain oriented and aligned with each other even in the unlocked position.

One example of a hand-held injection device that utilizes ball-locks is shown and described in U.S. Pat. No. 6,770,054 (the "'054 Patent"). The '054 Patent is incorporated by reference herein in its entirety. The injection device disclosed in the '054 Patent includes a ball lock assembly that is locked and then released (unlocked) in order to drive a pneumatic piston in the distal direction, which in turn drives the distal movement of a medicine piston in order to expel medication from the device.

Figure 1:
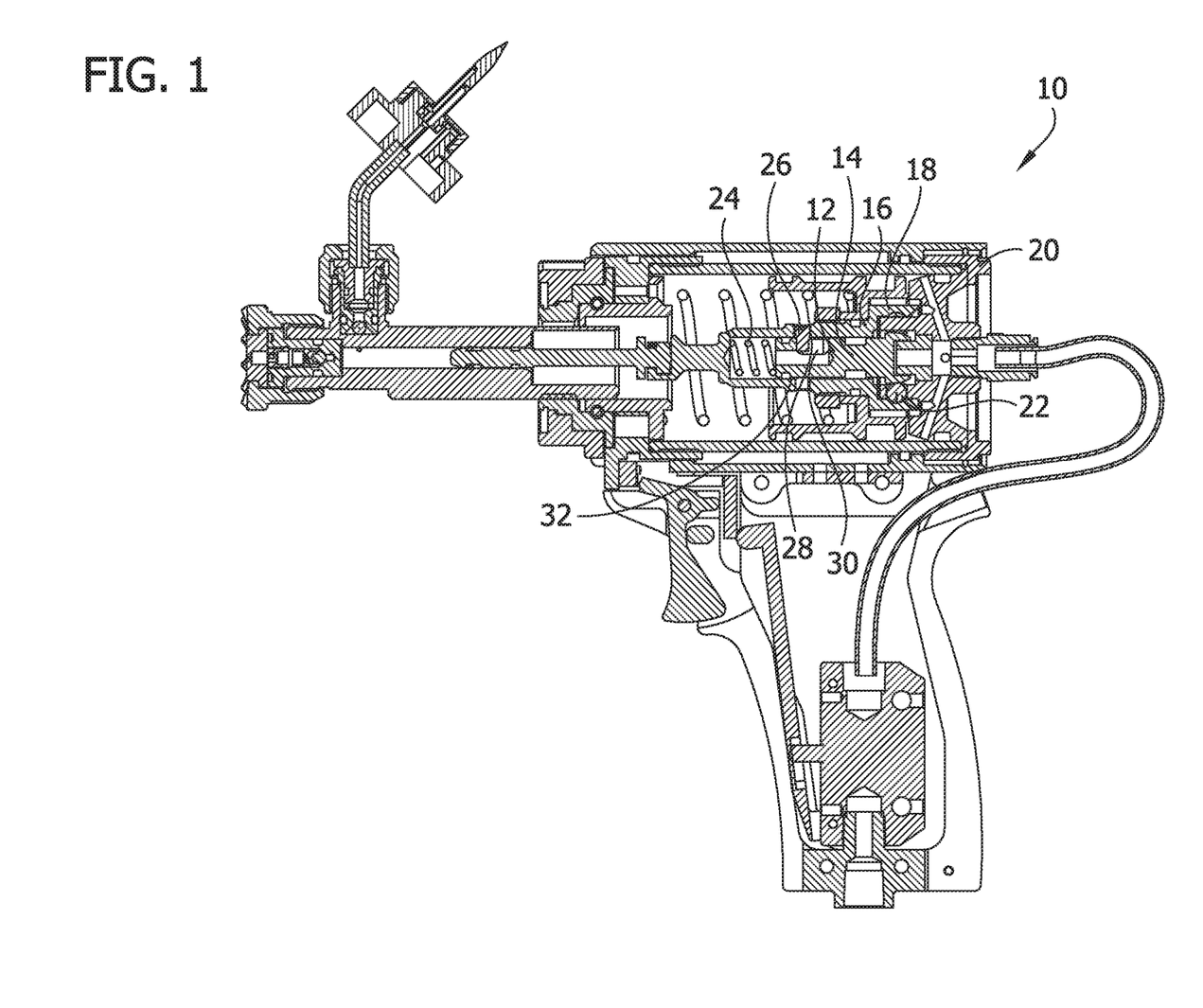
FIG. 1 is a cross-sectional view of an injection device with a ball lock assembly of the prior art.

One exemplary embodiment of the '054 Patent is the Pulse 50 Micro Dose Injection System™ ("the P50") manufactured by Pulse Needle Free Systems. The P50 is shown in FIG. 1 and is designated with the numeral 10. Injection device 10 includes a ball lock assembly 12, which in turn includes: a ball lock core 14, a ball lock frame 16, a separator 18 formed in or attached to the outer housing 20 of the injection device 10, at least one ball 22, a spring 24, and a retention screw 26. Screw 26 is positioned within an opening formed by a cylindrical sidewall 28 in ball lock frame 16 and is anchored to cylindrical sidewall 28 via threaded attachment. A longitudinal groove 30 is formed by a longitudinal rounded and recessed surface positioned in an outer cylindrical surface 32 of ball lock core 14. A distal portion of screw 26 is positioned within groove 30. Screw 26 and groove 30 enable the proximal and distal movement of ball lock core 14, while at the same time confining that distal movement between two set endpoints. More specifically, ball lock core 14 is at its most distal position when screw 26 abuts a proximal end of longitudinal rounded and recessed surface 30 (i.e.—the fully unlocked position at the top of the stroke) and is at its most proximal position when screw 26 abuts a distal end of longitudinal rounded and recessed surface 30 (i.e.—the locked position at the bottom of the stroke).

The performance of the threaded connection of screw 26 to cylindrical sidewall 28 is very important to the performance of the entire injection device given that: 1) it determines when ball lock assembly 12 is locked or unlocked and 2) ball lock assembly 12 repetitiously cycles between the locked and unlocked positions each time an injection is performed. Although ball lock assembly 12 of injection device 10 functions as intended, there are certain drawbacks associated with the utilization of screw 26, including but not necessarily limited to the following.

First, as with all threaded connections, the threaded connection of screw 26 to ball lock frame 16 is not precise due to imperfections and tolerances that allow for movement between the female threads of cylindrical sidewall 28 and the male threads of screw 26. The movement or "play" associated with the threaded connection prevents precise control over the movement of ball lock core 14 and relative to the position of ball lock frame 16. As a result, ball lock assembly 12 may fail to properly lock and/or unlock given that ball lock core 14 may fail to complete full strokes, resulting in it stopping in locations between the fully locked and fully unlocked positions.

Second, screw 26 is prone to becoming unscrewed from cylindrical sidewall 28 due to the repetitive impacts associated with the repetitious cycling of ball lock assembly 12 between the locked and unlocked positions. The partial or total separation of screw 26 from cylindrical sidewall 28 can lead to the separation of ball lock core 14 from ball lock frame 16, thereby rendering ball lock assembly 12 inoperable.

Third, the single point of attachment of screw 26 to ball lock frame 16 may function as a pivot point about which screw 26 may become compromised due to the repetitive and forceful contact of a lower portion of screw 26 with the distal and proximal ends of groove 30 with each injection cycle. As a result, screw 26 may become bent, deformed, and/or broken, which may render ball lock assembly 12 inoperable.

BRIEF SUMMARY OF THE INVENTION

In an aspect, the present invention is directed to a ball lock assembly for use with an injection device. The injection device includes a ball lock frame, a ball lock core housed within the ball lock frame, and a retention pin. The ball lock core includes a longitudinal opening. A portion of the retention pin is positioned within the longitudinal opening. The pin is anchored to the ball lock frame at two or more points. The retention pin and longitudinal opening are configured to allow the proximal and distal movement of ball lock core. The ball lock assembly is in a locked position when the ball lock core is in the most proximal position of the ball lock core.

Preferably, the ball lock core is at the most proximal position of the ball lock core when the retention pin abuts a distal end of the longitudinal opening. In one embodiment, the ball lock core is at its most distal position when the retention pin abuts a proximal end of the longitudinal opening.

Preferably, the ball lock assembly includes a fastener configured to restrict the lateral movement of the pin. In one embodiment, the fastener is an external frame nut that is attachable to an outer surface of the ball lock frame and is positionable over each end of the pin in order to restrict the lateral movement of the pin.

Preferably, the pin is not threadably attachable to the ball lock frame. Preferably, the ball lock frame and ball lock core remain in axial alignment relative to one another in both the locked and any unlocked positions.

In an embodiment, the ball lock assembly also includes a separator, at least one ball, and a resilient member. Preferably, the resilient member is a mechanical spring. Preferably, the ball lock frame, ball lock core, and separator remain in axial alignment relative to one another in both the locked and any unlocked positions.

In another aspect, the present invention is directed to an injection device that includes the ball lock assembly of the present invention.

In yet another aspect, the present invention is directed to a method of using the injection device of the present invention. The method requires applying a first force to a proximal end of the ball lock core when the ball lock assembly is in the locked position. The first force is sufficient to exceed a second force applied by the resilient member to a distal end of the ball lock core. The first force forces a distal movement of the ball lock core, thereby compressing the resilient member and moving the ball lock core out of contact with one or more balls and forcing the one or more balls to become unbiased from within corresponding one or more grooves in the ball lock frame. The ball lock core moves to a distal position of the ball lock core, the ball lock frame moves to a distal position of the ball lock frame, and a pneumatic piston attached to the ball lock frame moves to a distal position of the pneumatic piston. The distal movement of the ball lock frame and the pneumatic piston causes the distal movement of an injectate piston connected to the pneumatic piston. The distal movement of the injectate piston forces an injectate stored in a dose chamber of the injection device out of the dose chamber.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

In an aspect, the present invention is directed to a ball lock assembly for an injection device. The ball lock assembly of the present invention can be utilized with injection devices, such as the injection device disclosed in the '054 Patent, and as described herein, overcomes the problems associated with ball lock assembly 12.

Figure 2:
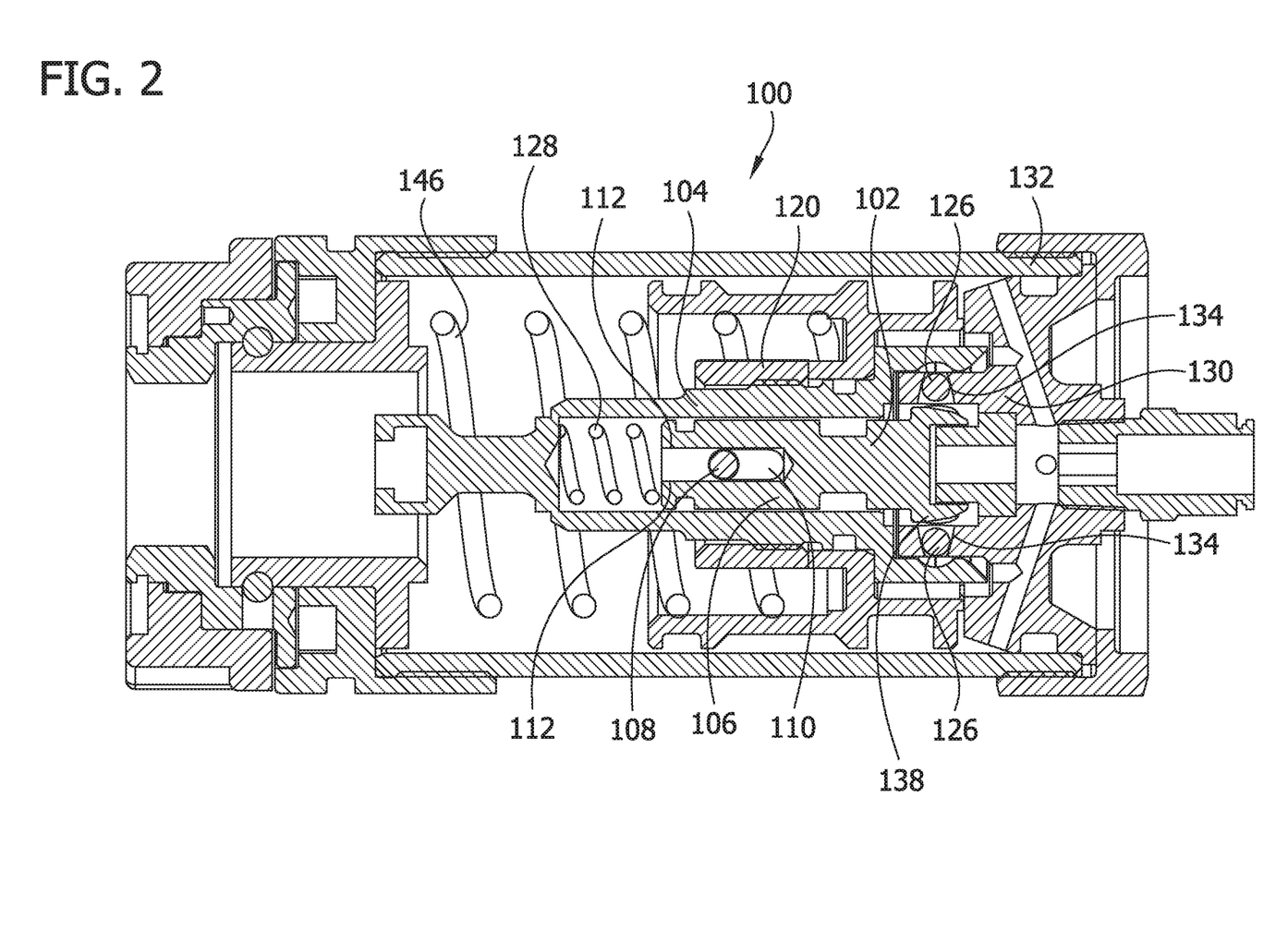
FIG. 2 is a cross-sectional view of an injection device with the ball lock assembly of the present invention taken along line 2-2 of FIG. 3, wherein the ball lock assembly is in the locked position.
Figure 3:
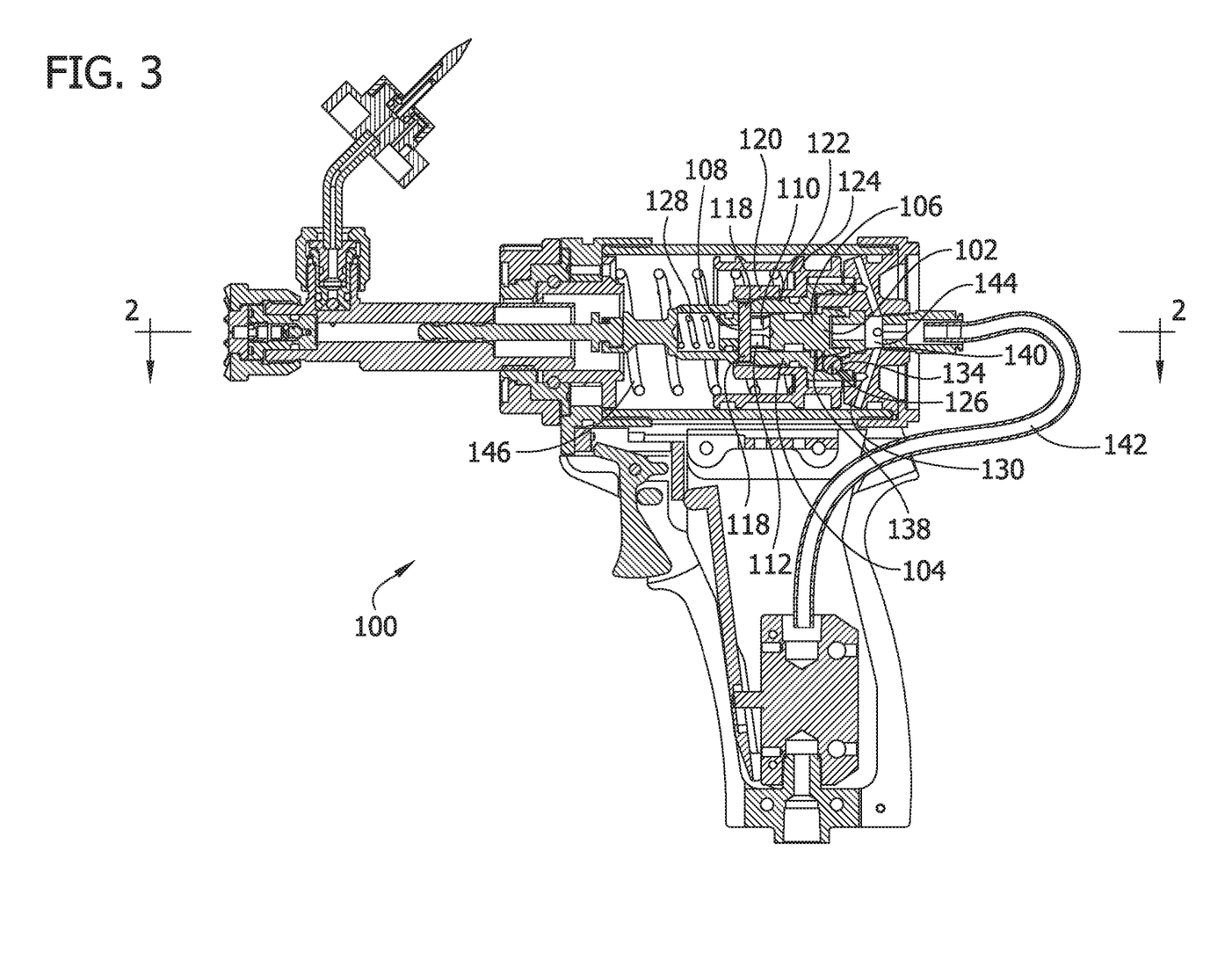
FIG. 3 is a cross-sectional view of the injection device of FIG. 2, wherein the ball lock assembly is in the locked position.
Figure 4:
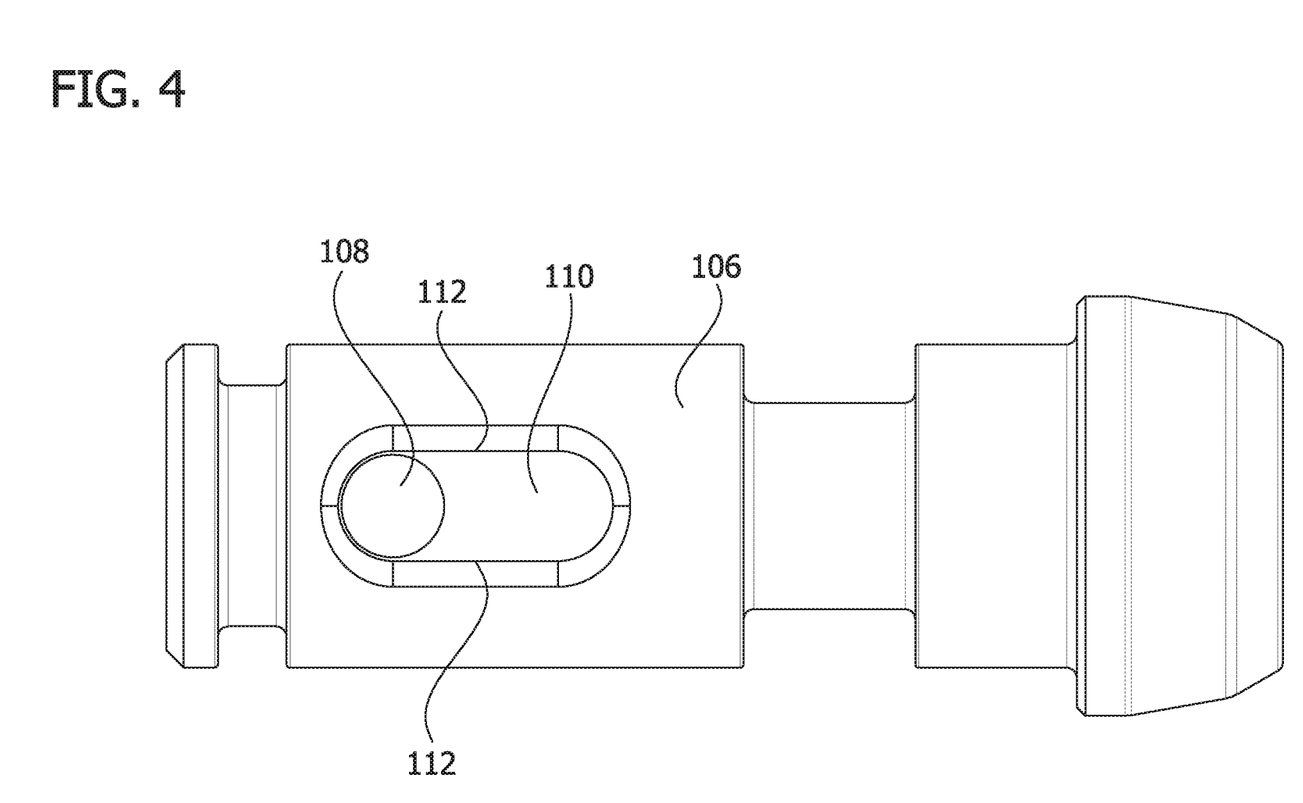
FIG. 4 is a top plan view of the ball lock core and pin of the ball lock assembly of FIG. 2.

Referring to FIG. 2, injection device 100 includes ball lock assembly 102. Ball lock assembly 102 includes a ball lock frame 104, a ball lock core 106 housed within ball lock frame 104, and a retention pin 108. Ball lock core 106 defines a longitudinal opening 110 that extends through ball lock core 106, preferably between diametrically opposed positions on an outer surface of ball lock core 106, as shown in FIG. 3. As depicted in FIGS. 2-4, a portion of retention pin 108 is positioned within longitudinal opening 110. In the embodiment depicted in FIG. 2-4, ball lock core 106 is generally cylindrical, longitudinal opening 110 is formed with a rounded rectangular sidewall, and parallel walls 112 of longitudinal opening 110 loosely abut an outer surface of a generally cylindrical retention pin 108. However, other shapes of ball lock core 106, longitudinal opening 110 and retention pin 108 may be used consistent with the present invention. Ball lock frame 104 and ball lock core 106 can comprise any suitable ball lock core and ball lock frame known in the art.

Figure 5:
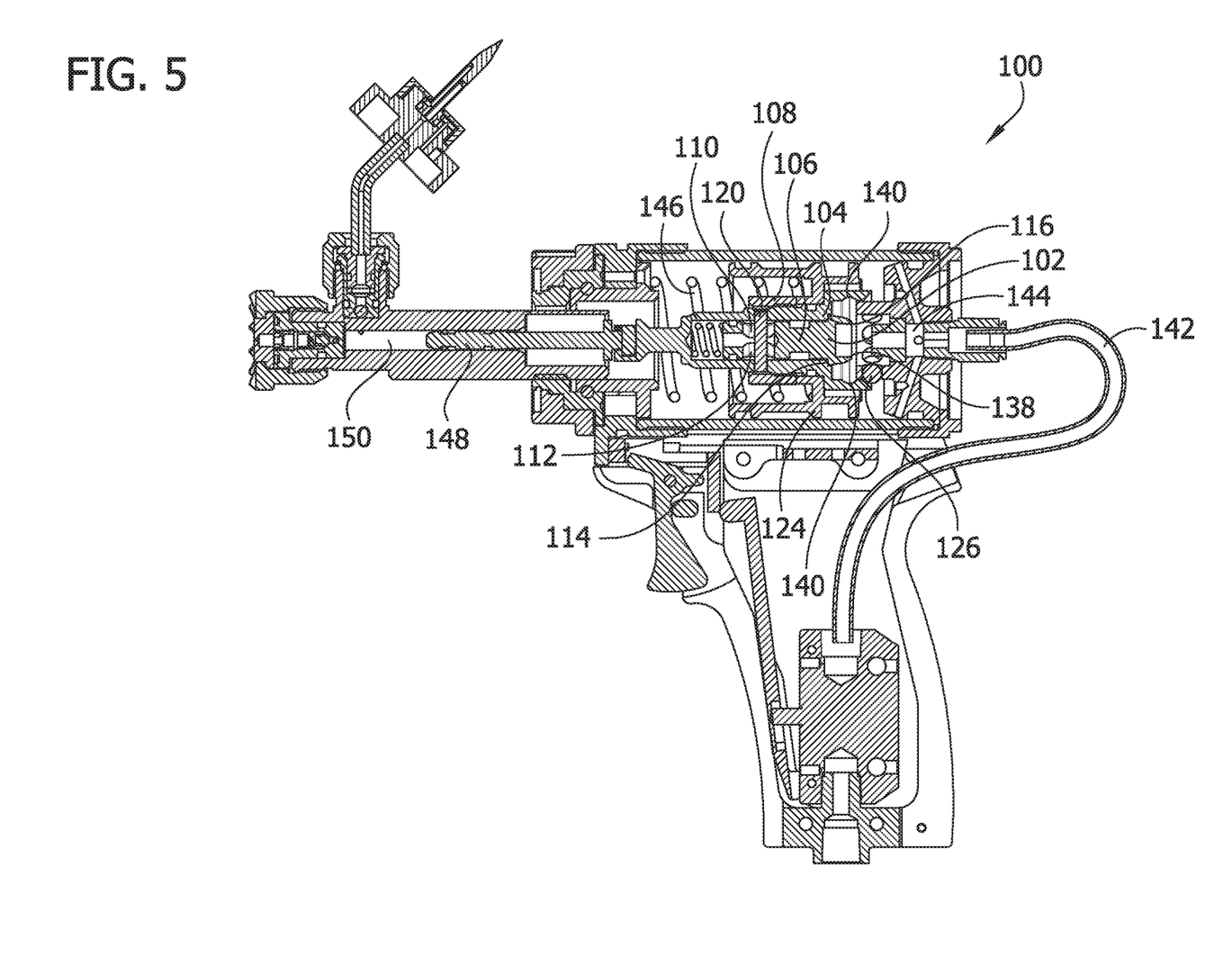
FIG. 5 is a cross-sectional view of the injection device of FIG. 2, wherein the ball lock assembly is in the fully unlocked position.

Retention pin 108 and longitudinal opening 110 allow the proximal and distal movement of ball lock core 106 within ball lock frame 104, while at the same time limiting the proximal movement to a set endpoint. More specifically, ball lock core 106 is at its most proximal position when retention pin 108 abuts a distal end of longitudinal opening 110 (i.e.—the locked position at the bottom of the stroke shown in FIG. 3). As shown in FIG. 5, a cylindrical flange 114 of ball lock core 106 abuttingly engages a cylindrical flange 116 of ball lock frame 104, thereby limiting the distal movement of ball lock core 106 relative to ball lock frame 104. Ball lock core 106 and ball lock frame 104 remain in axial alignment relative to one another in both the locked and any unlocked positions.

Other configurations of flanges, abutting members, or other structures can be used to stop the distal movement of ball lock core 106 relative to ball lock frame 104. Although not shown, it is within the scope of the present invention for ball lock assembly 102 to be configured such that retention pin 108 allows the proximal and distal movement of ball lock core 106 within ball lock frame 104 while at the same time confining that movement between two set endpoints. In such an embodiment, the abutting engagement of cylindrical flanges 114 and 116 would not necessarily limit the distal movement of ball lock core 106 relative to ball lock frame 104. In such an embodiment, the ball lock core 106 would be at its most proximal position when retention pin 108 abuts a distal end of longitudinal opening 110 (i.e.—the locked position at the bottom of the stroke shown in FIG. 3) and would be at its most distal position when pin 108 abuts a proximal end of longitudinal opening 110 ((i.e.—the fully unlocked position at the top of the stroke shown in FIG. 5).

Referring to FIG. 3, each end of retention pin 108 is slidably positioned, preferably via interference fit, more preferably a precisely machined interference fit, within a respective one of two diametrically opposed pin openings 118 of ball lock frame 104. In the embodiment shown in FIG. 3, retention pin 108 is cylindrical and pin openings 118 are each formed from a respective cylindrical sidewall. An external frame nut 120 threadably attached to an outer surface 122 of ball lock frame 104 is positioned over each end of pin 108 to restrict its lateral movement. As shown, external frame nut 102 may also fixedly attach a pneumatic piston 124 to ball lock frame 104. Accordingly, configured as shown, retention pin 108 is anchored to ball lock frame 104 at two points. Although ball lock assembly 102 includes external frame nut 120, it is within the scope of the present invention for ball lock assembly 102 to include any other suitable fastener that is configured to restrict the lateral movement of pin 108. Preferably, retention pin 108 itself is not threadably attachable to ball lock frame 104. Furthermore, although retention pin 108 is shown anchored to ball lock frame 104 at only two points, it is within the scope of the present invention to anchor retention pin 108 to ball lock frame 104 at three or more points either with or without any suitable fastener.

Returning to FIG. 2, ball lock assembly 102 further incudes a plurality of spherical balls 126, a resilient member, such as a spring 128, and separator 130. Although ball lock assembly 102 depicted in the Figures includes a plurality of spherical balls 126, it is within the scope of the present invention for ball lock assembly 102 to include only one spherical ball 126. Separator 130 may be integrally formed with or attached to the outer housing 132 of injection device 100.

Figure 6:
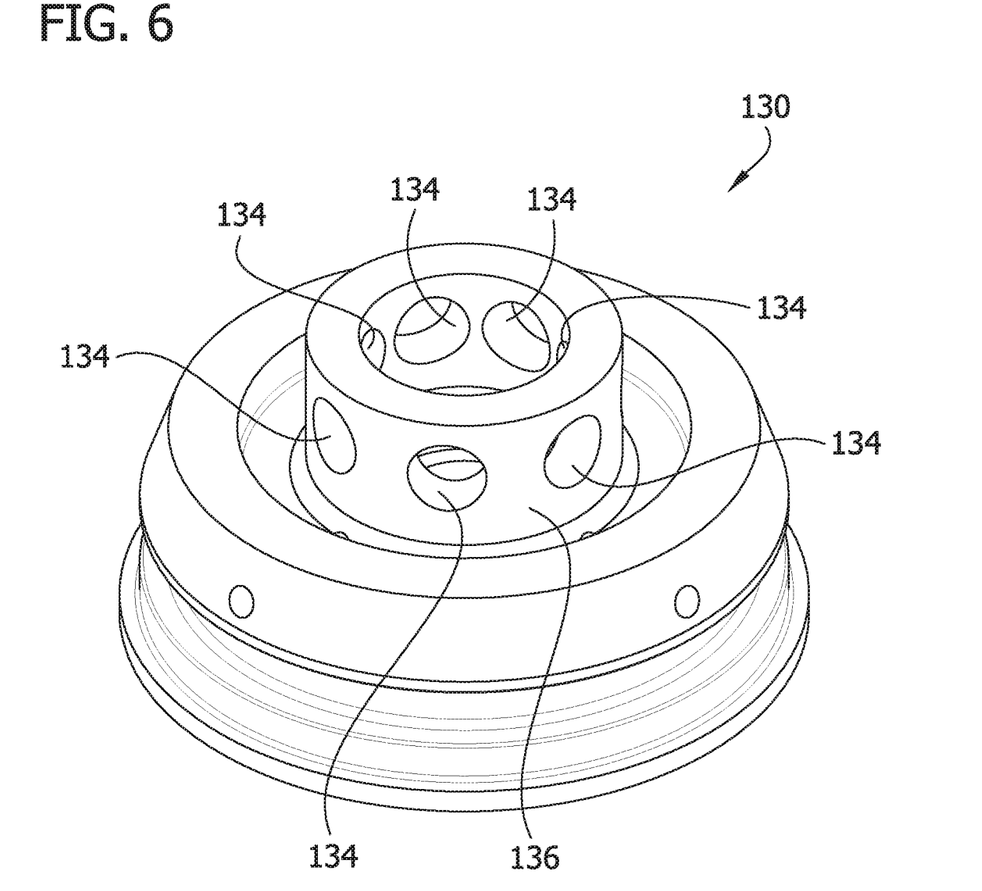
FIG. 6 is a perspective view of a distal portion of the separator of the ball lock assembly of the present invention.

Turning to FIG. 6, separator 130 includes a plurality of ball openings 134, each of which is preferably formed in a rim 136 of separator 130. As depicted in FIGS. 2 and 3, a portion of each ball 126 may be positioned within a respective ball opening 134. When in the locked position depicted in FIG. 3, mechanical spring 128—the proximal end of which is in abutting contact with a distal end of ball lock core 106—exerts force necessary to force a preferably bulbous proximal end 138 of ball lock core 106 against balls 126, thereby biasing at least a portion of each ball 126 within a respective ball opening 134 and into respective annular grooves 140 in ball lock frame 104 that are formed by semi-spherical recesses in ball lock frame 104 complimentary in shape to balls 126 (best seen in FIG. 5). As a result, the components of ball lock assembly 102 are held in the locked position by mechanical spring 128 and the biasing of at least a portion of each ball 126 within respective annular grooves 140 of ball lock frame 104 and within respective ball openings 134 of separator 130 by the proximal end 138 of ball lock core 106. It is noted that although ball lock assembly 102 includes mechanical spring 128, any other suitable resilient member that places resilient force on ball lock core may be utilized.

As described above, the components of the ball lock assembly 102 are movable between the locked position (shown in FIG. 3) and a fully unlocked (open) position (shown in FIG. 5). The unlocking of the ball lock system is effectuated by the application of force. As shown, injection device 100 is configured such that the force is provided by pressurized gas. Other suitable sources of force include, but are not necessarily limited to, hydraulic pressure. In order to move the components of ball lock assembly 102 out of the locked position shown in FIG. 3, pressurized gas is supplied via gas supply line 142 to gas supply conduit 144 where it is then directed to proximal portions of ball lock core 106, ball lock frame 104, and pneumatic piston 124, resulting in the application of force to these components. Pneumatic piston 124 is fixedly attached to ball lock frame 104 by external frame nut 120, though any nut or other suitable attachment device may be utilized. Once the force exerted by the gas to ball lock core 106 exceeds the force exerted by spring 128 upon ball lock core 106, the ball lock core 106 moves in a distal direction, thereby compressing mechanical spring 128 and moving proximal end 138 of ball lock core 106 out of contact with balls 126, resulting in balls 126 becoming unbiased from within annular grooves 140 of ball lock frame 104. The distal movement of ball lock frame 104 causes balls 126 to move laterally inward due to the contact of balls 126 with a proximal edge of annular grooves 140 of ball lock frame 104. As a result, balls 126 no longer prevent the distal movement of ball lock frame 104 and pneumatic piston 124, such that ball lock frame 104 and pneumatic piston 124 move distally, preferably to their most distal positions shown in FIG. 5 as a result of the force exerted by the gas. The distal movement of ball lock frame 104 and pneumatic piston 124 results in the compression of return spring 146—the proximal end of which is in abutting contact with a portion of pneumatic piston 124. Although return spring 146 is depicted in the Figures, any suitable resilient member may be used. Because there is accumulated gas pressure in conduit 144 at the moment that ball lock frame 104 begins to move in a distal direction, the impulse supplied to ball lock frame 104 and pneumatic piston 124 is relatively strong.

The locking of the ball lock system is effectuated by return spring 146 and spring 128. Once the application of pressurized gas has been discontinued, the force supplied to the distal end of ball lock core 106 as a result of the stored energy of compressed spring 128 causes ball lock core 106 to move in a proximal direction. Simultaneously, the force supplied to pneumatic piston 124 and ball lock frame 104 by return spring 146 causes the proximal movement of pneumatic piston 124, ball lock frame 104, and ball lock core 106. The simultaneous proximal movement of ball lock core 106, ball lock frame 104, and piston 124 continues until a distal end of longitudinal opening 110 comes into abutting contact with retention pin 108 and proximal end 138 of ball lock core 106 contacts and forces balls 126 laterally outward and into a biased position within respective annular grooves 140 of ball lock frame 104 and within respective ball openings 134 of separator 130. Ball lock core 106, ball lock frame 104, and separator 130 remain in axial alignment relative to one another in both the locked and any unlocked positions. Although ball lock assembly 102 has been described with respect to certain configuration of ball locks and injection devices, a ball lock assembly of the invention comprising retention pin 108 and longitudinal opening 110 configured as described herein can be used with other ball lock and injection device configurations.

Ball lock assembly 102 presents a number of advantages as compared to ball lock assembly 12. The connection of retention pin 108 to ball lock frame 104 eliminates the potential of free play in the sub-assembly that controls the stroke of the ball lock core given that it does not include any threaded connections and has at least two connect points to the ball lock frame (screw 26 is anchored at only one point). As a result, the deformation of the pin 108 resulting from its impact with ball lock core 106 is reduced as compared to the deformation of screw 26 resulting from its impact with ball lock core 14. This multi-anchor configuration results in significantly improved structural integrity of ball lock assembly 102 as compared to that of ball lock assembly 12. As a result, unlike screw 26, pin 108 does not pivot or flex, which results in more consistent and improved positioning and alignment of ball lock core 106 as compared to ball lock core 14. Furthermore, the multi-anchor configuration results in a reduced load per square inch on the surface of ball lock frame 104 as compared to the load per square inch on the surface of ball lock frame 16. Moreover, the load per square inch is further reduced due to the fact that the surface area of ball lock core 106 that comes into contact with pin 108 is larger than the surface area of ball lock core 14 that comes into contact with screw 26. Additionally, while the threaded connection of screw 26 to ball lock frame 16 is impacted by the load of ball lock core 14 striking screw 26, the fastener of the ball lock assembly 102 (external frame nut 120), which eliminates the need for retention pin 108 to have threaded connections to ball lock frame 104, is not impacted by the load of ball lock core 106 striking retention pin 108. As a result, the lateral securement of pin 108 to ball lock frame 104 is not negatively impacted.

In another aspect, the present invention is directed to a method of using an injection device that includes the ball lock assembly of the present invention. Referring to FIG. 3, a force is applied via the supply of pressurized gas via gas supply line 142 to gas supply conduit 144 where it is then directed to proximal portions of ball lock core 106, ball lock frame 104, and pneumatic piston 124. Once the force exerted by the gas to ball lock core 106 exceeds the force exerted by spring 128 upon ball lock core 106, the ball lock core 106 moves in a distal direction, thereby compressing mechanical spring 128 and moving proximal end 138 of ball lock core 106 out of contact with balls 126, resulting in balls 126 becoming unbiased from within annular grooves 140. The distal movement of ball lock frame 104 causes balls 126 to move laterally inward due to the contact of balls 126 with a proximal edge of annular grooves 140. As a result, balls 126 no longer prevent the distal movement of ball lock frame 104, and ball lock core 106, ball lock frame 104, and piston 124 move distally, preferably to their most distal positions shown in FIG. 5, as a result of the force exerted by the gas. Because there is accumulated gas pressure in conduit 144 at the moment that ball lock frame 104 begins to move in a distal direction, the impulse supplied to ball lock frame 104 is relatively strong. The distal movement of the ball lock frame 104 and the pneumatic piston 124 to the positions shown in FIG. 5 causes the distal movement of the injectate piston 148, which is connected to the pneumatic piston 124. The distal movement of the injectate piston 148 forces an injectate (not shown) stored in a dose chamber 150 of the injection device 100 out of dose chamber 150. Although the method of using an injection device comprising a ball lock assembly of the present invention has been described with respect to certain configurations of ball locks and injection devices, the method can be performed with other ball lock and injection device configurations comprising a ball lock assembly of the invention comprising retention pin 108 and longitudinal opening 110 configured as described herein.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

I claim:

1. A ball lock assembly for use with an injection device comprising:
    ball lock frame;
    a ball lock core housed within the ball lock frame;
    a retention pin; and
    a fastener configured to restrict a lateral movement of the retention pin;
    wherein the ball lock core comprises a longitudinal opening, wherein a portion of the retention pin is positioned within the longitudinal opening;
    wherein the retention pin is anchored to the ball lock frame at two or more points;
    wherein the retention pin and longitudinal opening are configured to allow the proximal and distal movement of the ball lock core and to limit the proximal movement of the ball lock core to a set endpoint;
    wherein the ball lock assembly is in a locked position when the ball lock core is in a most proximal position of the ball lock core; and
    wherein the ball lock core is at the most proximal position of the ball lock core when the retention pin abuts a distal end of the longitudinal opening.

2. The ball lock assembly of claim 1, wherein the ball lock core is at a most distal position of the ball lock core when the retention pin abuts a proximal end of the longitudinal opening.

3. The ball lock assembly of claim 1, wherein the fastener is an external frame nut, wherein the external frame nut is attachable to an outer surface of the ball lock frame and is positionable over each end of the retention pin in order to restrict the lateral movement of the retention pin.

4. The ball lock assembly of claim 1, wherein the retention pin is not threadably attachable to the ball lock frame.

5. The ball lock assembly of claim 1, wherein the ball lock frame and ball lock core remain in axial alignment relative to one another in both the locked position and an unlocked position.

6. The ball lock assembly of claim 1, further comprising:
    a separator;
    at least one ball; and
    a resilient member.

7. The ball lock assembly of claim 6, wherein the resilient member is a mechanical spring.

8. The ball lock assembly of claim 6, wherein the ball lock frame, ball lock core, and separator remain in axial alignment relative to one another in both the locked position and an unlocked position.

9. An injection device comprising the ball lock assembly of claim 1.

10. A method of using the injection device of claim 9, comprising:
    applying a first force to a proximal end of the ball lock core when the ball lock assembly is in the locked position;
    wherein the first force is sufficient to exceed a second force applied by the resilient member to a distal end of the ball lock core;
    wherein the first force forces a distal movement of the ball lock core, thereby compressing the resilient member and moving the ball lock core out of contact with one or more balls and forcing the one or more balls to become unbiased from within corresponding one or more grooves in the ball lock frame;

wherein the ball lock core moves to a distal position of the ball lock core, the ball lock frame moves to a distal position of the ball lock frame, and a pneumatic piston attached to the ball lock frame moves to a distal position of the pneumatic piston;

wherein the distal movement of the ball lock frame and the pneumatic piston causes the distal movement of an injectate piston connected to the pneumatic piston; and wherein the distal movement of the injectate piston forces an injectate stored in a dose chamber of the injection device out of the dose chamber.

11. The ball lock assembly of claim 1, wherein the retention pin is anchored to the ball lock frame at at least two diametrically opposed points, and wherein the longitudinal opening of the ball lock core extends through the ball lock core between diametrically opposed positions on an outer surface of the ball lock core.

12. A ball lock assembly for use with an injection device comprising:
 ball lock frame;
 a ball lock core housed within the ball lock frame; and
 a retention pin;
 wherein the ball lock core comprises a longitudinal opening, wherein a portion of the retention pin is positioned within the longitudinal opening;
 wherein the retention pin is anchored to the ball lock frame at two or more points;
 wherein the retention pin and longitudinal opening are configured to allow the proximal and distal movement of the ball lock core and to limit the proximal movement of the ball lock core to a set endpoint;
 wherein the ball lock assembly is in a locked position when the ball lock core is in a most proximal position of the ball lock core;
 wherein the ball lock core is at the most proximal position of the ball lock core when the retention pin abuts a distal end of the longitudinal opening; and
 wherein the ball lock frame and ball lock core remain in axial alignment relative to one another in both the locked position and an unlocked position.

13. The ball lock assembly of claim 12, further comprising a fastener configured to restrict a lateral movement of the retention pin.

14. The ball lock assembly of claim 12, further comprising:
 a separator;
 at least one ball; and
 a resilient member.

15. The ball lock assembly of claim 14, wherein the resilient member is a mechanical spring.

16. An injection device comprising the ball lock assembly of claim 12.

17. The ball lock assembly of claim 3, further comprising:
 a separator;
 at least one ball; and
 a resilient member.

18. The ball lock assembly of claim 17, wherein the ball lock frame, ball lock core, and separator remain in axial alignment relative to one another in both the locked position and an unlocked position.

19. An injection device comprising the ball lock assembly of claim 17.

* * * * *